United States Patent Office 3,298,468
Patented Jan. 17, 1967

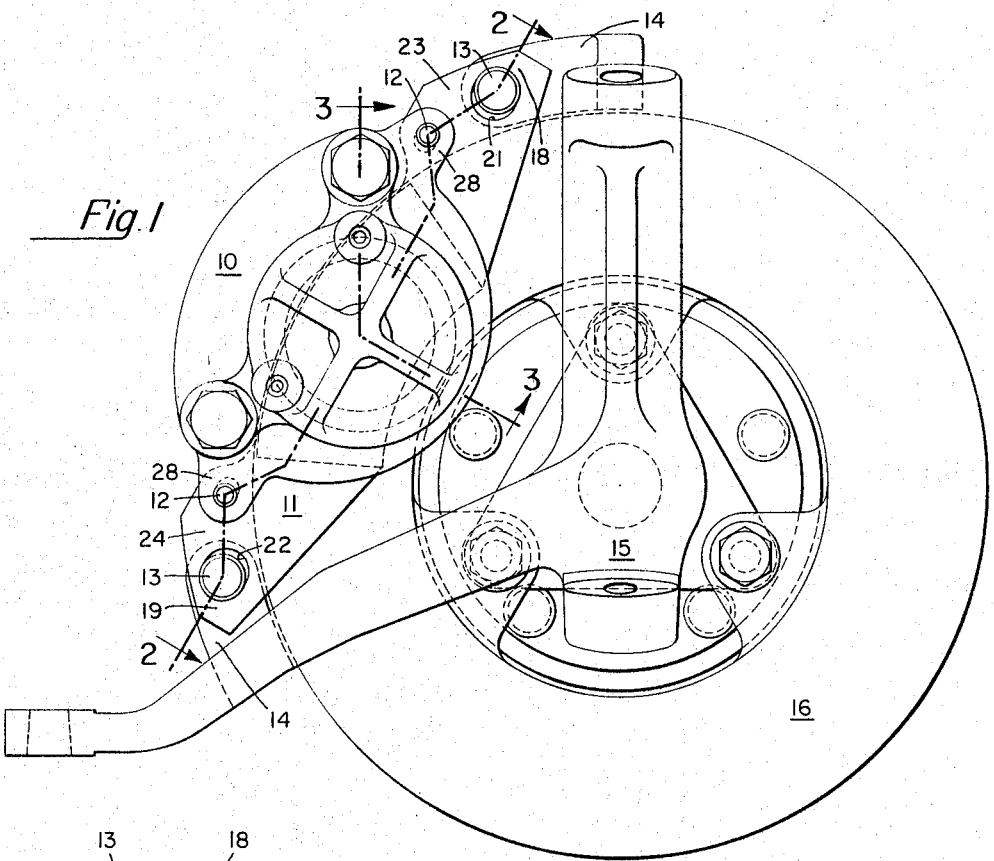
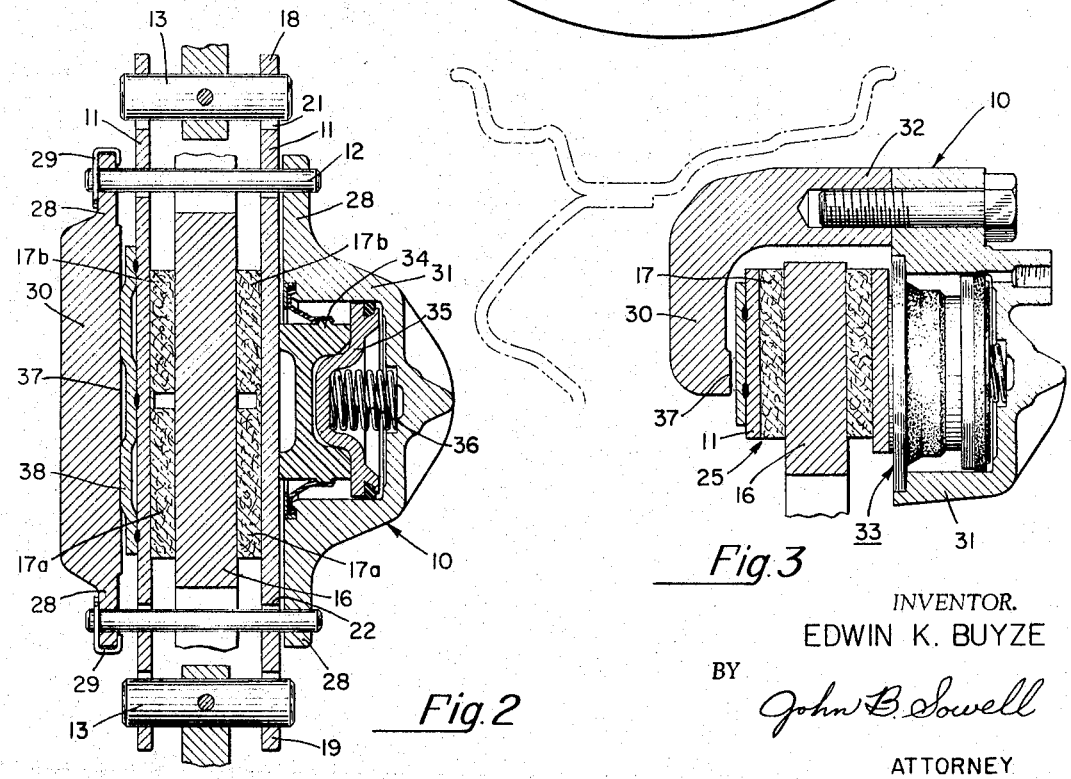

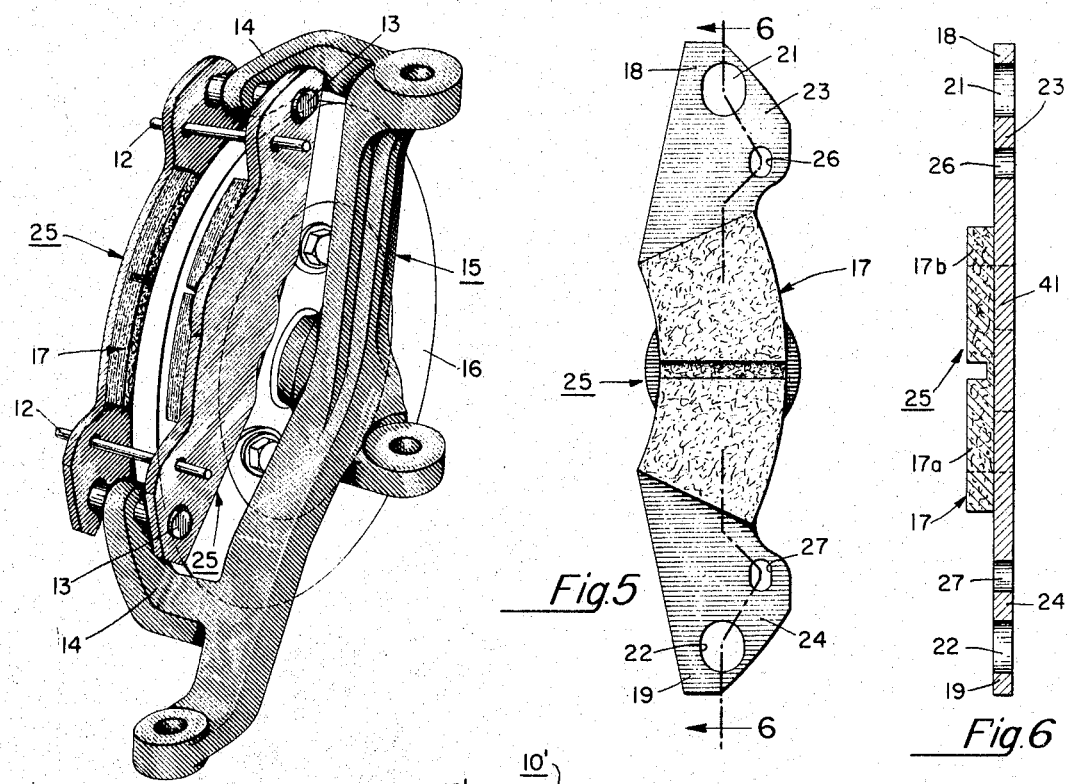
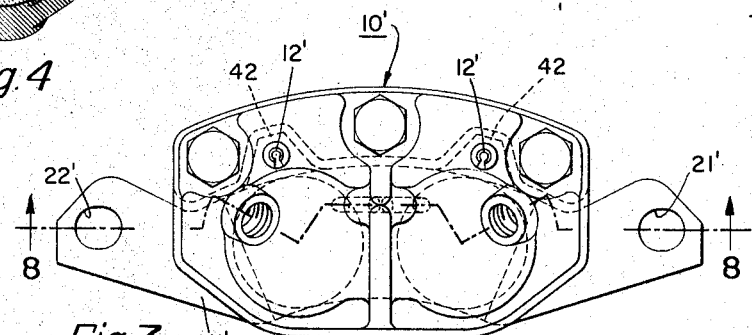
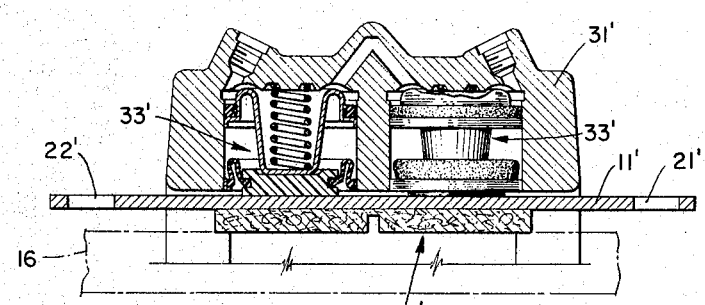

3,298,468
CALIPER-TYPE DISK BRAKES
Edwin K. Buyze, St. Clair Shores, Mich., assignor to The Budd Company, Philadelphia, Pa., a corporation of Pennsylvania
Filed Dec. 24, 1964, Ser. No. 420,867
5 Claims. (Cl. 188—73)

This invention relates to an improved light-weight disk brake and more particularly to a novel structural arrangement of brake shoes and caliper.

It is known that the friction pads of disk brakes tend to wear unevenly due to eccentric loading of the brake shoes and to caliper distortion. It is undesirable to increase the stiffness of a caliper by increasing its weight. It is further undesirable to compensate for caliper distortion and uneven wear of the break shoes by introducing costly self-aligning and self-centering piston devices.

Heretofore numerous expensive structural elements have been introduced into various arrangements of caliper and shoes which serve solely to compensate for uneven shoe wear, these devices increase the weight of the disk brake, increase cost of manufacture beyond commercially acceptable limits, and complicate maintenance and/or replacement of the wearing parts.

Therefore, it is a principal object of the present invention to provide a simple, reliable, commercially successful, novel light-weight disk brake which compensates for uneven shoe wear without the necessity of special structural devices.

It is a further object of the present invention to provide a simplified caliper for exerting axial braking forces on brake shoes that transmit torsional braking forces directly into the anchor supports.

It is another object of the present invention to provide an improved mounting and support structure for a double-trailing shoe disk brake.

In accordance with the invention there is provided a pair of elongated backing plates, spaced opposite a chordal segment of an axially fixed brake disk and having end mounting portions extending outward from a central pad mounting portion, friction pads are connected to the central portion of the backing plate spaced opposite the chordal segment of the brake disk, said end mounting portions of the backing plates are provided with an elongated aperture through which anchor pins are fitted to engage the outward end of said aperture, thus providing stabilized double-trailing shoe braking action during braking and further providing support for the brake shoes, a C-shaped caliper has limbs positioned opposite the central portion of the backing plate and adapted to engage the portion of the backing plate opposite the friction pads on a line of thrust offset from the center of the friction pads toward the center of rotation of the brake disc, thus providing compensation for uneven wear of the pads due to radial eccentric loading and to caliper distortion, means are provided for mounting the caliper on the end mounting portion of the backing plate, thus axially floatingly supporting the caliper on the brake shoes relative to the brake disk.

Other features and objects of the invention will be found throughout the more detailed description of the invention, which follows.

To more clearly portray the invention and its manner of operation, the description is supplemented with the accompanying drawing wherein:

FIG. 1 is a side elevation of a preferred embodiment disk brake;

FIG. 2 is a section in elevation taken on line 2—2 of FIG. 1;

FIG. 3 is a section in elevation taken on line 3—3 of FIG. 1;

FIG. 4 is a perspective view showing the brake shoes of the disk brake of FIG. 1 and the novel mounting structure;

FIG. 5 is a front elevation of the preferred embodiment brake shoe;

FIG. 6 is a side elevation in section taken at line 6—6 of FIG. 5;

FIG. 7 is a side view of a modified disk brake;

FIG. 8 is a section view taken at line 8—8 of FIG. 7.

Referring to the drawings which illustrate a preferred embodiment of the present invention, a C-shaped caliper 10 is shown mounted on a backing plate 11 by mounting pins 12. The backing plate 11 is in turn mounted on anchor pins 13 extending from fixed anchor supports 14 provided on a spindle assembly 15. Assuming the counterclockwise rotation of brake disk 16 provides movement in the forward direction, the application of the brakes supplies a clamping action to the backing plates 11, causing friction pads 17 to engage the brake disk 16. The torsional force from disk 16 is transmitted through the friction pad to the backing plate connected thereto and directly to the outward ends 18 and 19 of the apertures 21 and 22, where only the outward end 18 of the aperture 21 engages its anchor pin 13 in trailing shoe restraint.

In the preferred embodiment, the uppermost end mounting portion 23, of the backing plate 11 will be placed in tension during forward rotation of the brake disk 16 providing a trailing shoe restraint. In similar manner a clockwise rotation of the brake disk 16 will place the lowermost end mounting portion 24 of the backing plate 11 in tension without stressing the uppermost end mounting portion 23.

Friction pads 17 may be normally offset in the direction of normal forward rotation by extending the trailing friction pad 17a or foreshortening the leading friction pad 17b. It has been found that the outward extended trailing shoe end mounting portion provides substantially even circumferential wear of the friction pad 17 and that offset compensation of the friction pads 17a and/or 17b completely compensates for uneven wear due to torsional eccentric forces.

Brake shoes 25 comprising the backing plate 11 and friction pad 17, are mounted on fixed anchor pins 13 to permit axial movement of the shoes relative to the axially fixed brake disk 16. The C-shaped caliper 10 is preferably mounted for axial movement on the axially movable brake shoes at the respective end mounting portions 23 and 24 of the brake shoes 25 by mounting pins 12. Pins 12 pass through apertures 26 in backing plate 11 and are fitted into apertures 27 provided in ears or extensions 28 of the C-shaped caliper 10. Bifurcated spring clamps 29 prevent movement of pins 12.

C-shaped caliper 10 comprises limbs 30 and 31 and a spacer portion 32 which interconnects the limbs 30 and 31. In the preferred embodiment limb 31 is provided with a single hydraulic piston 33, comprising an insulating and isolating thrust member 34 normally engaged by a piston plate 35 and a spring 36.

It may be observed from FIGS. 2 and 3 that the center of thrust of piston 33 occurs below the center of the area of friction pad 17 and that limb 30 is provided with a raised linear ridge 37 which engages raised linear ridges 38 provided on the backing plate 11 opposite the limb 30. It has been found that this slight offset of the center of thrust of piston 33 and limb 30 compensates for the tendency of uneven radial wear of the friction pads. Actual tests have confirmed that the entire usable volume of the friction material may be utilized by employing the simplified structural arrangement explained hereinbefore.

Referring now to FIG. 4 where brake shoes 25 are shown mounted on anchor pins 13 provided in fixed anchor supports 14 extending from the spindle assembly 15. It is to be understood that the fixed anchor supports 14 may be supported by other fixed members not illustrated in the preferred embodiment. For example, a disk brake for the rear wheels of an automobile is not provided with a spindle assembly. Therefore, a torque taking member, such as a fan-shaped stationary member may be provided to which the anchor pins 13 are affixed.

One of the preferred embodiment brake shoes 25 is shown in detail in FIGS. 5 and 6. Apertures 21 and 22 are shown elongated to be adapted for engagement with cylindrical anchor pins 13 at the outward ends 18 and 19. Apertures 26 and 27 provided in the end mounting portions 23 and 24 of the backing plate 11 are shown elongated in shape to facilitate ease of removal and insertion of mounting pins 12. Friction pads 17 are connected to the central mounting portion 41 of the backing plate 11 intermediate the end mounting portions 23 and 24.

In the modified disk brake, shown in FIGS. 7 and 8, apertures 21' and 22' are provided in backing plate 11' for mounting the brake shoes 25' on anchor pins 13. The modified C-shaped caliper 10' is provided with 2 pistons 33' located in limb 31'. Mounting pins 12' are located in the caliper body and support the caliper 10' on mounting extensions 42 of the modified backing plate 11.

It will be observed that the elongated and extending backing plate 11 cooperates directly with the torque taking member (anchor pin 13) at a point remote from the friction pads 17, thus, presenting a minimum angle of offset between the anchor point and the center of the friction pad. While the structural arrangement has been found adequate to compensate for normal eccentric circumferential wear, a slight shifting of the friction pads in the direction of the rotation substantially eliminates all eccentric wear as commonly occurs with other types of brake shoes. The same principle can be applied to leading shoes by changing the location of apertures.

The outward extended end mounting portions 23 and 24 of the backing plate 11 provide a convenient and simple support means for the C-shaped caliper 10. Other areas of the backing plate, such as mounting extensions 42 of FIG. 7, permit the housing to be mounted axially movable relative to the brake disk 16 and in a manner which avoids stress loading of the caliper 10 due to braking forces.

In the preferred embodiment of FIGS. 1 to 6 a single actuating piston has been described in only one of the limbs 30 and 31. Should single piston, or dual pistons, be employed in each of the limbs, the C-shaped caliper 10 may be fixed axially relative to the brake disk 16. Since the present novel combination of shoes and caliper does not exert torsional braking stresses either on or through the caliper, other simple pins or bracket members capable of supporting the weight of the caliper will suggest themselves to those skilled in the art, and may be attached directly to a fixed member. Other additions and improvements, such as vibration damping grommets, may be embodied in the present invention. It is accordingly desired that the appended claims be given a broad interpretation commensurate with the scope of this invention in the art.

What is claimed is:
1. Disk brake comprising: an axially fixed rotatable disk and axially movable non-rotatable housing having limbs straddling said disk, a pair of elongated backing plates each axially located between a limb of said housing and a side of said disk, said backing plates each having end portions extending circumferentially outward from said housing, a friction pad member connected to each said backing plate between said end portions and axially located between a backing plate and a side of said disk, at least one fluid motor in a limb of said housing adapted to engage said friction pad members with said disk to transmit torque from said disk to said backing plates, an axially and rotationally fixed support including a pair of fixed thrust anchors located radially outward from and in axial alignment with said disk, apertures in said end portions of said backing plates, anchor pins fixedly connected to said thrust anchors extending axially through said apertures in said end portions of said backing plates and located circumferentially outward in said apertures to provide trailing restraint by said friction pad members on said disk, and means mounting said housing on said end portions of said backing plates for solely supporting said housing thereby, said housing and said means mounting said housing being free from torsional forces transmitted to said backing plates from said disk.

2. A disk brake of the type having trailing brake shoes during forward and reverse rotational braking action upon a brake disk; a C-shaped caliper housing comprising, a pair of limbs extending radially alongside the brake disk, an axial spacer portion connecting said limbs radially beyond said disk, and a pair of housing mounting ears extending radially outward from each said limb and circumferentially outward from said axial connector portion of said housing; a pair of brake shoes each comprising, elongated backing plates having a central portion and a pair of end portions extending circumferentially outward beyond said housing, a friction pad mounted on said backing plate at said central portion intermediate said end portions and located axially between a limb of said housing and said brake disk, and a plurality of apertures in each end portion of each said backing plate; a plurality of fixed anchor pins each attached to a fixed support, each pin being located in the outward end of one of said apertures in each end portion of each said backing plate for supporting said brake shoes and providing trailing shoe restraint to said brake shoes; and a pair of mounting pins located in the other of said plurality of apertures of each said backing plate connecting said housing mounting ears to said end portions of said backing plates for solely supporting said housing on said backing plates, whereby said housing is supported in torsion-free restraint on said backing plate.

3. A disk brake of the type having trailing shoes during forward and reverse rotational braking action; a pair of brake shoes comprising, an elongated backing plate having a central portion lying opposite a sector of a brake disk and an end portion extending therefrom located circumferentially outward and radially beyond said brake disk, a friction pad connected to each said backing plate at said central portion; a pair of anchor pins attached to an anchor support fixed relative to said brake disk, apertures in the end portions of said backing plates for mounting said backing plates on said anchor pins at the outer ends of said apertures, said anchor pins providing the sole support and torsional restraint for said backing plates, and a caliper having a hydraulic piston actuator therein mounted and solely supported on the end portions of said backing plates for engaging said friction pad with said brake disk in trailing shoe torsional restraint.

4. In combination with a rotatable brake disk, a rotationally and axially fixed support, and a disk brake adapted to be mounted on said fixed support; said disk brake including a pair of elongated backing plates, each said plate having a central pad mounting portion and a pair of end connector portions outboard of said central pad mounting portions, a friction pad connected to said central pad mounting portion of each said backing plate, an elongated anchor aperture in each of said end connector portions, anchor pins provided on said fixed support for cooperating with said anchor apertures for supporting said backing plate and resisting torsional forces applied thereto when said pads contact said rotating brake disk, a fluid motor for moving said pads into contact with said brake disk upon command, an axially movable fluid motor housing having limbs extending adjacent said backing plates opposite said central pad mounting portion, a spacer portion connecting said limbs, ears extending circumferentially outward from said spacer portion, apertures in said ears, mounting pins connecting said apertures in said ears with said end connector portions of said backing plates for floatingly mounting said housing on said backing plates isolated from torsional forces transmitted from said disk to said backing plates and permitting axial movement of said housing relative to said disk, said mounting pins being the sole support for said housing on said backing plates.

5. A disk brake of the type described in claim 4, wherein one said limb is provided with an axially raised engagement portion located radially below the center of the area of said friction pad, and the backing plate engaged by said limb is further provided with axially raised radial ribs.

References Cited by the Examiner

UNITED STATES PATENTS

| | | | |
|---|---|---|---|
| 2,934,174 | 4/1960 | Lucien | 188—73 |
| 2,937,722 | 5/1960 | Ruet | 188—73 |
| 2,966,964 | 1/1961 | Brueder | 188—73 |
| 3,168,167 | 2/1965 | Walther | 188—73 |
| 3,194,351 | 7/1965 | Swift | 188—73 |
| 3,245,500 | 4/1966 | Hambling et al. | 188—73 |

FOREIGN PATENTS 77,016  11/1961  France.

MILTON BUCHLER, *Primary Examiner.*

G. HALVOSA, *Assistant Examiner.*